(12) United States Patent
Donescu

(10) Patent No.: US 6,990,213 B2
(45) Date of Patent: Jan. 24, 2006

(54) METHOD AND DEVICE FOR PROCESSING AND WATERMARKING A SET OF COEFFICIENTS REPRESENTING A DIGITAL IMAGE

(75) Inventor: Ioana Donescu, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 10/041,576

(22) Filed: Jan. 10, 2002

(65) Prior Publication Data

US 2002/0141612 A1    Oct. 3, 2002

(30) Foreign Application Priority Data

Jan. 10, 2001    (FR)    ................................. 01 00266

(51) Int. Cl.
*G06K 9/00*    (2006.01)
(52) U.S. Cl. ...................... 382/100; 382/232; 382/240; 358/3.28; 713/176; 370/529
(58) Field of Classification Search ................ 382/100, 382/232, 240; 358/3.28; 713/176, 179; 380/51, 54, 201, 210, 252, 287; 348/461, 348/463; 370/522, 523, 524–529
See application file for complete search history.

(56) References Cited

U.S. PATENT DOCUMENTS

| | | | | |
|---|---|---|---|---|
| 5,748,783 | A | 5/1998 | Rhoads | ........................ 382/232 |
| 6,332,030 | B1 * | 12/2001 | Manjunath et al. | .......... 382/100 |
| 6,385,329 | B1 * | 5/2002 | Sharma et al. | ............... 382/100 |
| 6,456,744 | B1 * | 9/2002 | Lafe | ............... 382/248 |
| 6,792,128 | B1 * | 9/2004 | Nguyen | ....................... 382/100 |
| 2004/0001608 | A1 * | 1/2004 | Rhoads | ........................ 382/100 |
| 2004/0125983 | A1 * | 7/2004 | Reed et al. | .................. 382/100 |
| 2004/0264732 | A1 * | 12/2004 | Tian | ............................ 382/100 |

FOREIGN PATENT DOCUMENTS

EP    1 043 687 A1    11/2000

OTHER PUBLICATIONS

"Perceptual Digital Watermark of Images Using Wavelet Transform", Wei, et al., IEEE Transactions on Consumer Electronics, vol. 44, No. 4, Nov. 1998, pps. 1267-1272.
"A New Wavelet-Based Scheme for Watermarking Images", Dugad, et al., ICIP '98-International Conference on Image Processing, IEEE Computer Society, vol. 2, Conf. 5, Oct. 1998, pps. 419-423.
U.S. Appl. No. 09/544,159, filed Apr. 6, 2000.
U.S. Appl. No. 09/450,750, filed Nov. 30, 1999.

* cited by examiner

*Primary Examiner*—Kanjibhai Patel
*Assistant Examiner*—Ali Bayat
(74) *Attorney, Agent, or Firm*—Fitzpatrick, Cella, Harper & Scinto

(57) ABSTRACT

The invention concerns a method of processing a set of coefficients representing a digital image (300) with a view to an insertion of at least one item of watermarking information in said image, this image being liable to undergo a set of geometric transformations and said coefficients being grouped together in regions, said method being characterized in that it includes a step (E220) of determining, amongst at least some of said regions, a set of so-called acceptable regions, adapted to receive said at least one item of watermarking information; and a step (E230) of sequencing, according to at least one predetermined criterion, at least one part of said set of acceptable regions, in an order which is invariant with respect to at least one of said geometric transformations.

37 Claims, 10 Drawing Sheets

METHOD AND DEVICE FOR PROCESSING AND WATERMARKING A SET OF COEFFICIENTS REPRESENTING A DIGITAL IMAGE

The present invention concerns a method and device for processing a set of coefficients representing a digital image with a view to the insertion of at least one item of watermarking information.

More precisely, the invention concerns those of these methods and devices for which the watermarking information insertion method is said to be robust, that is to say the watermark inserted must be decodable after various distortions undergone by the image.

More particularly also, the invention is concerned with robustness vis-à-vis a group of geometric transformations, which are combinations of rotation through multiples of 90 degrees and vertical axis symmetries.

Through the American patent granted under the number U.S. Pat. No. 5,748,783, an image watermarking method which is robust to rotations and symmetries is known, the image being represented by a set of coefficients divided into blocks. The watermark which is inserted is formed by circles disposed in a rosette and partially superimposed. This watermark can, by this method, be found after the image has undergone a rotation of 90°, for example.

Unfortunately, this method is not adaptable to "spread spectrum" watermarking methods, where each watermarking information bit is inserted by adding a pseudo-random signal to all the coefficients of a block.

The robust watermarking of a digital image by a "spread spectrum" method raises in fact a particular problem which will now be described. As stated above, "spread spectrum" watermarking, as described for example in the patent application EP 1.043.687 of Canon published on 11 Oct. 2000, makes it possible, by the insertion of a watermarking signal by the coder, to insert a single watermarking information bit in a block of coefficients. To insert a larger number of information bits in the digital image, in particular when it is wished to have a watermarking code C composed of c bits $C_1, C_2, \ldots, C_c$, indicating, for example, the name of the owner of the image, it is necessary to reiterate the insertion method as many times as there are information bits to be inserted. It is therefore necessary to choose a corresponding number of blocks of coefficients adapted to be watermarked by each of the watermarking information bits. More precisely, for example, a first block $B^1$ will receive a first bit $b_1$ according to the first bit $C_1$ of the watermarking code C, a second block $B^2$ will receive a second bit $b_2$ according to the second bit $C_2$ of the watermarking bit C, and so on as far as the last block $B^c$, which will receive a last bit $b_c$ according to the bit $C_c$ of the watermarking code.

In a known manner, the decoder is capable, statistically, and if the blocks $B^i$ have been suitably chosen, of finding the bit $b_i$ which is a function of the bit $C_i$ of the watermarking code C inserted in the block $B^i$. However, for the watermarking method to be termed robust, it is necessary for the decoder also to be capable of putting the decoded bits $C_i$ of the watermarking code back in the original order of the bits of the watermarking code C, even after the image has undergone a geometric transformation. In other words, the decoder must be able to find again the order in which the blocks of coefficients $B^i$ were watermarked. However, the known methods do not make it possible to find this order again.

In seeking a method of watermarking an image which is robust vis-à-vis a set of geometric transformations, the applicant perceived that it would be advantageous to find a method of processing the image prior to the watermarking which makes it possible, when the watermarked image is subsequently decoded, to find once again the order indicated above.

The object of the present invention is thus a method of processing a set of coefficients representing a digital image with a view to an insertion of at least one item of watermarking information in said image, this image being liable to undergo a set of geometric transformations and said coefficients being grouped together in regions, said method being characterised in that it includes the following steps:

determining, amongst at least some of said regions, a set of so-called acceptable regions, adapted to receive said at least one item of watermarking information; and sequencing, according to at least one predetermined criterion, at least one part of said set of acceptable regions, in an order which is invariant with respect to at least one of said geometric transformations.

In this document, the term "region" is used for designating a subset of the coefficients of the digital image, such as a zone, a sub-band of a wavelet decomposition, a part of such a sub-band, or a region of interest (ROI) as defined by the JPEG2000 specifications.

Correlatively, the object of the invention is a device for processing a set of coefficients representing a digital image with a view to an insertion of at least one item of watermarking information in said image, this image being liable to undergo a set of geometric transformations and said coefficients being grouped together in regions, said device being characterised in that it has:

means of determining, amongst at least some of said regions, a set of so-called acceptable regions, adapted to receive said at least one item of watermarking information; and means of sequencing, according to at least one predetermined criterion, at least one part of said set of acceptable regions, in an order which is invariant with respect to at least one of said geometric transformations.

The invention thus makes it possible to prepare and order a certain number of regions intended to be watermarked by at least one item of watermarking information, with the assurance that the order of these regions will be found again unambiguously even if the image has undergone at least one of said geometric transformations.

According to one characteristic, said regions of coefficients representing a digital image correspond to the frequency sub-bands of a wavelet decomposition of said digital image.

Thus the sequencing of the regions can take place in parallel with a wavelet compression of the digital image.

Another object of the invention is a method of watermarking a set of coefficients representing a digital image which is liable to undergo a set of geometric transformations and said coefficients being grouped together in regions, said method being characterised in that it includes the following steps:

determining a set of so-called acceptable regions and sequencing, according to at least one predetermined criterion, of at least one part of said set of acceptable regions, in an order which is invariant with respect to at least one of said geometric transformations, according to the processing method briefly disclosed above; and inserting at least one item of watermarking information, for at least certain regions of said at least one part of said set of acceptable regions, said at least one item of watermarking information being invariant with respect to at least one of said geometric transformations.

Correlatively, the invention relates to a device for watermarking a set of coefficients representing a digital image which is liable to undergo a set of geometric transformations and said coefficients being grouped together in regions, said device being characterised in that it has:

- means of determining, from amongst at least some of said regions, a set of so-called acceptable regions, adapted to receive said at least one item of watermarking information;
- means of sequencing, according to at least one predetermined criterion, at least one part of said set of acceptable regions, in an order which is invariant with respect to at least one of said geometric transformations; and
- means of inserting at least one item of watermarking information, for at least certain regions in said at least one part of said set of acceptable regions, said at least one item of watermarking information being invariant with respect to at least one of said geometric transformations.

Thus the invention makes it possible to watermark the ordered regions in accordance with the processing according to the invention with an item of watermarking information which is itself invariant with respect to the geometric transformations. The combination of the processing and watermarking thus makes it possible to effect a robust watermarking with respect to these geometric transformations, this watermarking consisting of several items of watermarking information.

According to one characteristic, the insertion of said at least one item of watermarking information for an acceptable region corresponds to the spreading of a pseudo-random signal over all the coefficients of said region, this signal being generated from a key specific to said region.

This characteristic thus makes it possible to considerably increase the security of the watermarking, without for all that degrading the appearance of the digital image.

The invention also relates to a method of decoding a watermarking code obtained from at least one item of watermarking information inserted in a set of coefficients representing a digital image, this image being liable to have undergone a set of geometric transformations and said coefficients being grouped together in regions, said method being characterised in that it includes the following steps:

- determining, amongst at least some of said regions, a set of so-called acceptable regions, adapted to receive said at least one item of watermarking information;
- determining a set of so-called watermarked regions amongst said set of acceptable regions, said watermarked regions having received said at least one item of watermarking information;
- decoding said at least one item of watermarking information for each of said watermarked regions;
- sequencing said watermarked regions according to at least one predetermined criterion, in an order which is invariant with respect to at least one of said geometric transformations; and
- reconstituting said watermarking code by sequencing the said watermarking information as a function of said sequencing of said watermarked regions.

Correlatively, the invention also relates to a device for decoding a watermarking code consisting of at least one item of watermarking information inserted in a set of coefficients representing a digital image, this image being liable to have undergone a set of geometric transformations and said coefficients being grouped together in regions, said device being characterised in that it has:

- means of determining, amongst at least some of said regions, a set of so-called acceptable regions, adapted to receive said at least one item of watermarking information;
- means of determining a set of so-called watermarked regions amongst said set of acceptable regions, said watermarked regions having received said at least one item of watermarking information;
- means of decoding said at least one item of watermarking information for each of said watermarked regions;
- means of sequencing said watermarked regions according to at least one predetermined criterion, in an order which is invariant with respect to at least one of said geometric transformations; and
- means of reconstituting said watermarking code by sequencing the said watermarking information as a function of said sequencing of said watermarked regions.

The invention thus enables a decoder to find once again a watermarking consisting of several items of watermarking information inserted in a digital image, after it has undergone at least one of said geometric transformations.

The invention also relates to a programmable apparatus including a processing, watermarking or decoding device as briefly disclosed above.

The invention also relates to an information storage means, possibly totally or partially removable, which can be read by a computer or a processor containing instructions of a computer program P1, characterised in that it makes it possible to implement the processing method briefly disclosed above.

The invention also relates to an information storage means, possibly totally or partially removable, which can be read by a computer or a processor containing instructions of a computer program P2, characterised in that it makes it possible to implement the watermarking method briefly disclosed above.

The invention also relates to an information storage means, possibly totally or partially removable, which can be read by a computer or a processor containing instructions of a computer program P3, characterised in that it makes it possible to implement the decoding method briefly disclosed above.

The invention also relates to a computer program product which can be loaded into a programmable apparatus, containing sequences of instructions or portions of software code for implementing the steps of the processing method, of the watermarking method or of the decoding method as briefly disclosed above, when said computer program is executed by a programmable apparatus.

The invention will be better understood in the light of the following description, given by way of example and made with reference to the accompanying figures, in which.

Figure 1:
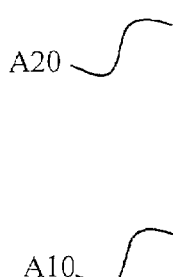
FIG. 1 depicts a table of a set of geometric transformations considered by the invention.

The table in FIG. 1 details an example of a set of geometric transformations considered by the invention. It can be noted that these transformations form a group of transformations in the mathematical sense of the term, that is to say any transformation obtained by a combination of these transformations is a transformation of the table. On each line in the table, there are found, in the left-hand column, the name of one of these transformations and, in the right-hand column, the transformation matrix corresponding to this transformation, in a reference frame centred with respect to a point which is invariant with respect to the group of transformations.

Figure 2:
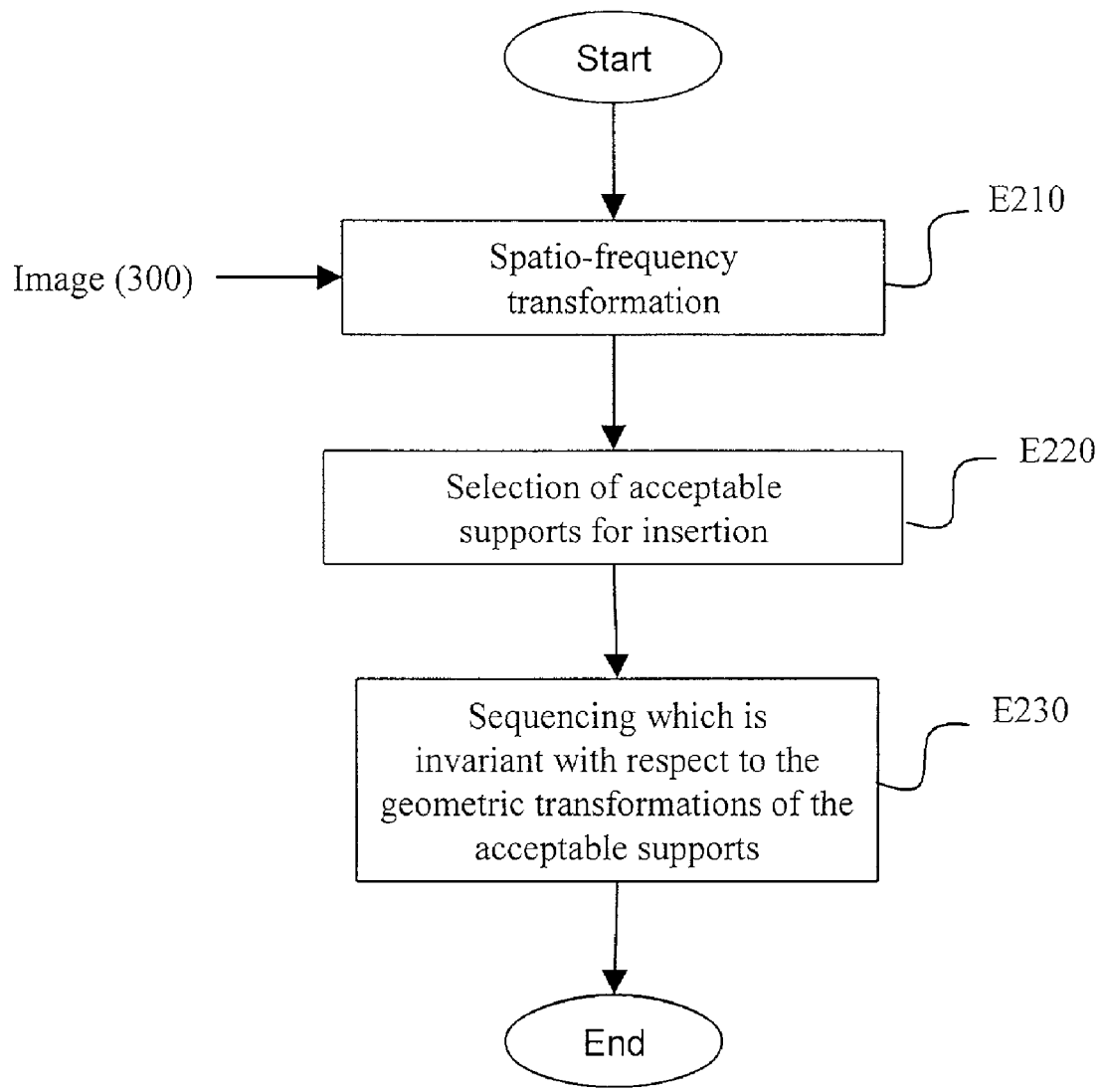
FIG. 2 depicts the main steps of a method of processing a digital image with a view to a watermarking which is robust with regard to a set of geometric transformations according to the invention.

The processing method according to the invention includes steps E210 to E230 (FIG. 2) and steps E410 to E460 (FIG. 4) implemented when one or more sequences of instructions of a computer program P1 are executed. As illustrated in FIG. 2, in a manner known in the field of the insertion of a watermarking signal in a digital image 300, a spectral or spatio-frequency transformation is applied to the image to be watermarked 300 during a first step E210. Thus a representation of the image is obtained in a spectral or spatio-frequency domain. In this example, a spatio-frequency transformation is used based on a conventional wavelet decomposition of the DWT (Discrete Wavelet Transform) type, which makes it possible to obtain hybrid coefficients, that is to say spectral coefficients also located in the plane of the image in the spatial domain.

Figure 3A:
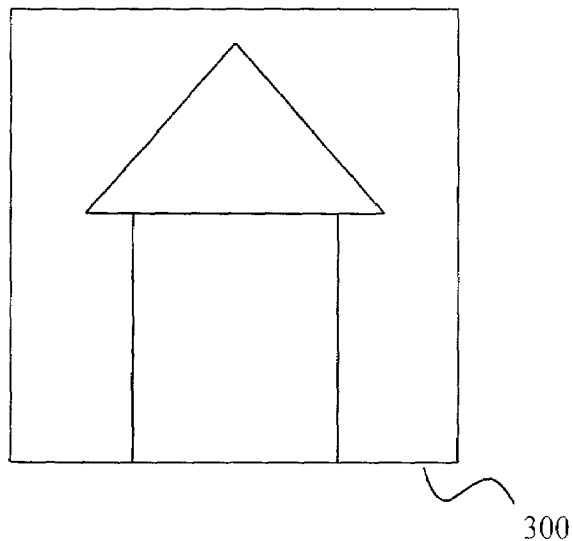
FIGS. 3a and 3c depict respectively a digital image and its symmetry with respect to a horizontal axis.
Figure 3B:
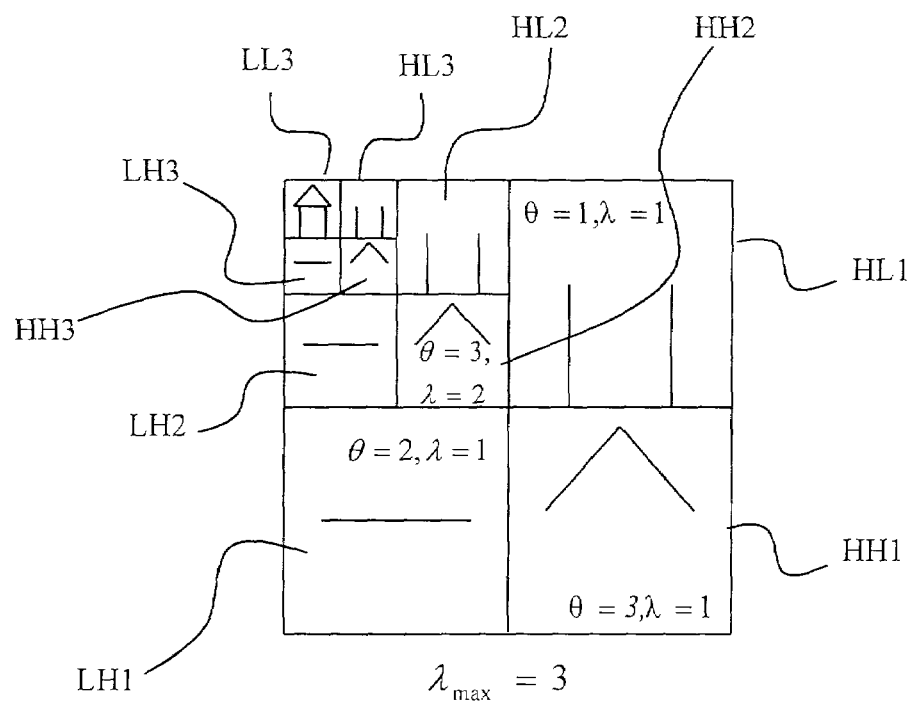
FIGS. 3b and 3d depict respective wavelet transforms of FIGS. 3a and 3c.

A scheme for the conventional wavelet decomposition of an image 300 illustrated by FIGS. 3a and 3b is now described.

The image 300 of FIG. 3a consists of a series of digital samples. The image 300 is for example represented by a series of bytes, each byte value representing a pixel of the image 300, which may be a black and white image, with 256 levels of grey.

The multiresolution spectral decomposition means consist of a circuit for decomposition into sub-bands or analysis circuit, formed by a set of analysis filters, respectively associated with decimators by two. This decomposition circuit filters the image signal 300 in two directions, into sub-bands of low spatial frequencies and high spatial frequencies. The circuit includes several successive analysis units for decomposing the image 300 into sub-bands according to several resolution levels.

By way of example, and as illustrated in FIG. 3b, the image 300 is decomposed here into sub-bands with a maximum decomposition level of 3 ($\lambda$max=3).

Each of the sub-bands is characterised by its decomposition level ($\lambda$) and its orientation ($\theta$).

A first analysis unit receives the image signal 300 and filters it through two digital filters, respectively low-pass and high-pass, in a first direction, for example horizontal. After passing through decimators by two, the resulting filtered signals are in their turn filtered by two filters, respectively low-pass and high-pass, in a second direction, for example vertical. Each signal is once again passed through a decimator by two. There are then obtained, at the output from this first analysis unit, four sub-bands LL1 ($\lambda=1$, $\theta=0$), LH1 ($\lambda=1$, $\theta=2$), HL1 ($\lambda=1$, $\theta=1$) and HH1 ($\lambda=1$, $\theta=3$) with the highest resolution level in the decomposition.

The sub-band LL1 contains the components of low frequency in both directions of the image signal 300. The sub-band LH1 contains the components of low frequency in a first direction and of high frequency in a second direction of the image signal 300. The sub-band HL1 contains the components of high frequency in the first direction and the components of low frequency in the second direction. Finally, the sub-band HH1 contains the components of high frequency in both directions.

A second analysis unit in its turn filters the low frequencies sub-band LL1 in order to supply in the same way four sub-bands LL2 ($\lambda=2$, $\theta=0$), LH2 ($\lambda=2$, $\theta=2$), HL2 ($\lambda=2$, $\theta=1$) and HH2 ($\lambda=2$, $\theta=3$) of intermediate resolution level in the decomposition. Finally, in this example, the sub-band LL2 is in its turn analysed by a third analysis unit in order to supply four sub-bands LL3 ($\lambda=3$, $\theta=0$), LH3 ($\lambda=3$, $\theta=2$), HL3 ($\lambda=3$, $\theta=1$) and HH3 ($\lambda=3$, $\theta=3$) with the lowest resolution in this decomposition.

In this way ten sub-bands and three resolution levels are obtained. Naturally the number of resolution levels, and consequently of sub-bands, can be chosen differently, and can for example be four resolution levels with thirteen sub-bands.

Some sub-bands (LHn) contain the horizontal contours (horizontal low-pass (rows) and vertical high-pass (columns) filtering) at each decomposition level. Other sub-bands (HLn) contain the vertical contours (high-pass filtering by rows and low-pass by columns) at each decomposition level. Finally, other sub-bands (HHn) contain the diagonal contours, which corresponds to a high-pass filtering in both directions.

The sub-band of lowest frequency LL3 contains the results of the low-pass filterings in both directions for three decomposition levels. It contains a filtered and sub-sampled version of the original image and is called the approximation sub-band. The other sub-bands are detail sub-bands.

Figure 3C:
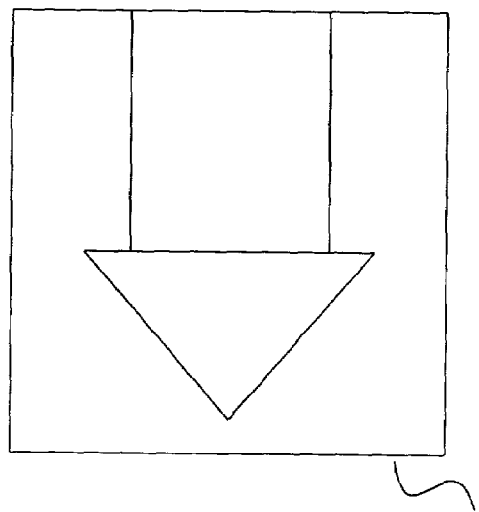
Figure 3D:
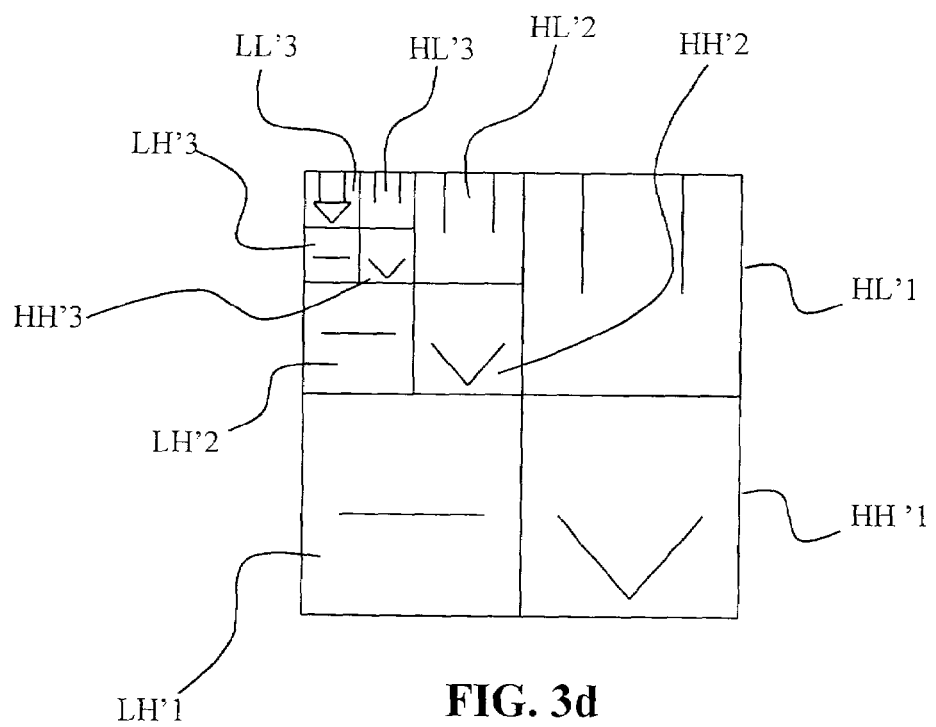

FIG. 3d shows the decomposition of the image 310 depicted in FIG. 3c and which corresponds to the image 300 after it has undergone a horizontal axis symmetry. This horizontal axis symmetry corresponds to the composition of the vertical axis symmetry denoted A10 and the 180 degree rotation denoted A20 in the table in FIG. 1. It is clear in FIG. 3d that the geometric transformation is applied in each of the sub-bands. By way of example, the approximation sub-band LL'3 corresponding to the image 310 is indeed obtained by a horizontal axis symmetry of the sub-band LL3 corresponding to the image 300. It should also be noted that, when it is a case of a rotation by an odd number of times 90 degrees, it is also necessary to reverse the sub-bands LH and HL since the vertical contours become the horizontal contours and vice versa.

It should be noted here that the wavelet decomposition can be omitted. It may be required by the watermarking method applied or by other considerations, such as for example the need to obtain a compression of the image at the same time as the watermarking.

Returning to FIG. 2, step E210 is followed by two steps E220 and E230 respectively of selection and sequencing of acceptable supports.

Step E220 effects the selection of acceptable supports for the insertion of at least one item of watermarking information, for example a set of blocks of coefficients $B^1, \ldots, B^N$, these blocks being considered as regions in the sense of the present invention. In the description of the watermarking by means of a "spread spectrum" method which will follow, each block of coefficients $B^i$ is in this case liable to be modified in order to encode an information bit. As described above, when the image 300 has undergone a conventional wavelet decomposition, it may for example be advantageous to retain the frequency sub-bands such that the probability of finding a watermarking bit inserted in these sub-bands is greater than a predetermined threshold. This method is described in the patent application published under the number EP 1.043.687.

Step E230, following on from step E220 in FIG. 2, concerns the sequencing, according to at least one predetermined criterion, of at least some of the acceptable blocks selected at step E220. This step E230 will now be detailed with reference to FIG. 4.

Whatever the case, the sequencing of the acceptable supports $\{B^1, \ldots, B^N\}$ must be done in such a way that this sequencing is effected in the same way at the coder and at the decoder, in a manner which is invariant with respect to the geometric transformations depicted in the table in FIG. 1 and with respect to the combinations of these geometric transformations. It should be noted that any geometric transformations undergone by the digital image are not known to the decoder.

In the preferred embodiment described here, the sequencing is effected first of all during steps E410 and E420 according to a set of g criteria $\{G_1, \ldots G_g\}$ known as "geometric criteria", which are independent of the coefficients of the digital image and of the watermarking signal.

Amongst these criteria there can be adopted, for example, in order to sequence the blocks of coefficients corresponding to the frequency sub-bands of a conventional wavelet decomposition of a digital image, the size of the block in question $G_1$, the type of sub-band $G_2$, the distance from the centre of the block to the centre of the sub-band $G_3$, and the index of the resolution level in the wavelet decomposition $G_4$, corresponding to the value λ described with reference to FIG. 3b. For the criterion $G_3$, the distance from the centre of the block to the centre of the sub-band is obtained by Pythagoras' theorem. For the criterion $G_2$, the sub-bands of type LH or HL on the one hand and the sub-bands of type HH on the other hand are distinguished.

The sequencing commences with a first step E410 of calculating the geometric criteria for the acceptable blocks.

Figure 5:
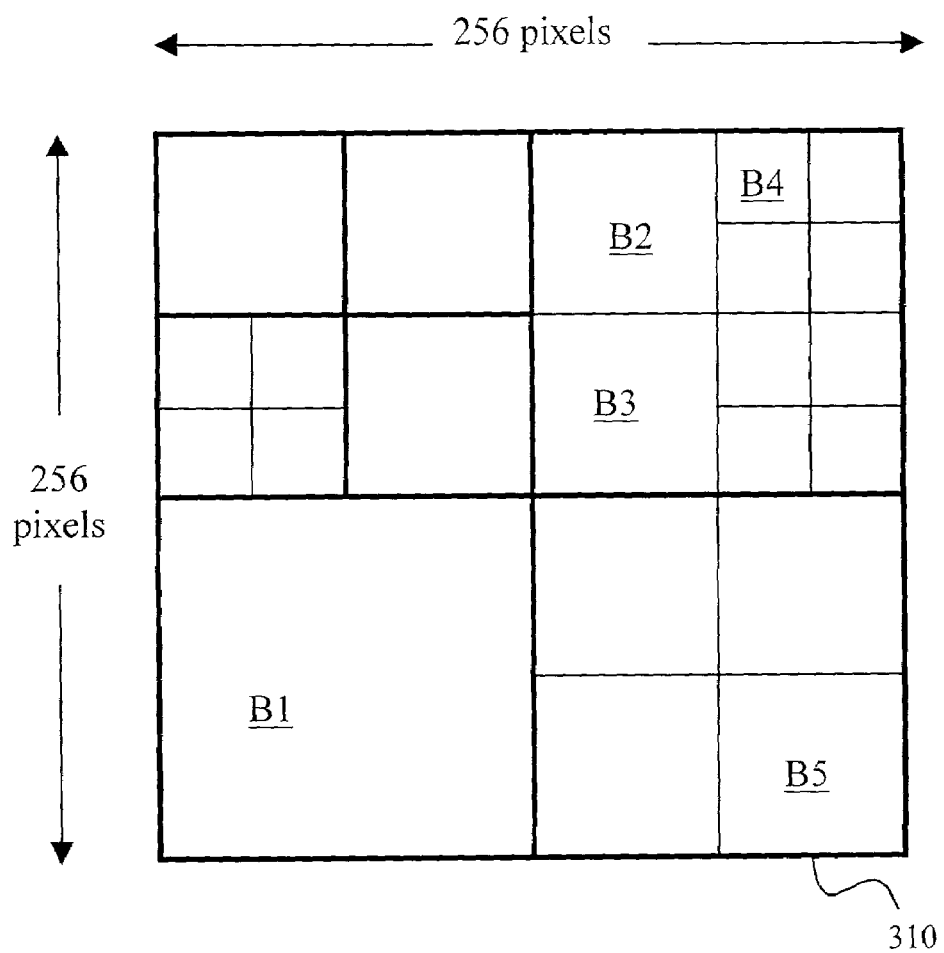
FIG. 5 depicts a set of regions of coefficients to be ordered of the transformed image of FIG. 3b, according to at least one predetermined criterion, in an order which is invariant with respect to a set of geometric transformations.

Table 1 below contains the values taken for the different criteria for the blocks $B^1$ to $B^5$ of the image 300 depicted in FIG. 5. These values are now explained for the block $B^1$.

Firstly, with regard to the criterion $G_1$, it is found that the block $B^1$ is a block 128 pixels square. As described above, this block corresponds to a frequency sub-band of level 1, of the type LH or HL, which gives the values of the criteria $G_2$ and $G_4$. Naturally, the distance from the centre of the block $B^1$ to the centre of the sub-band is 0. The values for the other blocks are obtained in a similar fashion. Subsequently, the formula $G^i_k$ will be adopted to designate the value of the criterion $G_k$ for the block $B^i$. For example, $G^1_4=1$.

TABLE 1

| | $B^1$ | $B^2$ | $B^3$ | $B^4$ | $B^5$ |
|---|---|---|---|---|---|
| $G_1$ | 128*128 | 64*64 | 64*64 | 32*32 | 64*64 |
| $G_2$ | (LH or HL) | (LH or HL) | (LH or HL) | (LH or HL) | (HH) |
| $G_3$ | 0 | $(32^2 + 32^2)^{1/2}$ | $(32^2 + 32^2)^{1/2}$ | $(16^2 + 48^2)^{1/2}$ | $(32^2 + 32^2)^{1/2}$ |
| $G_4$ | 1 | 1 | 1 | 1 | 1 |

At the end of step E410, the method effects a step E420 of sequencing of the acceptable blocks according to the geometric criteria. This step commences by sequencing the blocks $B^1$ to $B^5$ according to a first geometric criterion, for example $G_1$.

By adopting the following convention:

For $G_1$: $B^i<B^j$ if and only if $G_1^i<G_1^j$ and $B^i=B^j$ if and only if $G_1^i=G_1^j$, there is obtained, with reference to Table 1: $B^4<B^2=B^3=B^5<B^1$.

For the blocks which are not sequenced according to the geometric criterion $G_1$, the method according to the invention attempts to sequence the blocks according to a second geometric criterion, for example $G_2$.

Assuming that for $G_2$, $B^i<B^j$ if and only if $G_2^i$=(HH) and $G_2^j$=(LH or HL), $B^5<B^2=B^3$ is obtained.

That is to say, at the end of the step E420 of sequencing according to the criteria $G_1$ and $G_2$:

$B^4<B^5<B^2=B^3<B^1$

The sequencing according to the geometric criteria of step E420 continues in the same way with the geometric criteria $G_3$ and $G_4$. This sequencing terminates either when all the acceptable blocks are entirely sequenced, or when all the g geometric criteria have been used. In the example in Table 1, the values taken for the blocks $B^2$ and $B^3$ are identical for each of the criteria $G_1$ to $G_4$. These two blocks can therefore not be sequenced according to these criteria.

The method then effects, at step E430, a test during which it checks whether all the acceptable blocks have been sequenced according to the geometric criteria. If such is the case, the result of test E430 is positive and the sequencing is terminated.

On the other hand, where certain blocks are not sequenced, the result of test E430 is negative and the method then effects, for the non-sequenced blocks, a sequencing according to a set of criteria of the "signal" type. A criterion of the "signal" type is such that the value taken by a block for this criterion depends on the coefficients of this block.

The principle of sequencing according to the set of criteria of the "signal" type is similar to the one described for the sequencing according to the geometric criteria. It takes place according to a certain number s of ordered criteria of the "signal" type. However, it is important to note that the use of the criteria of the "signal" type is more tricky than the use of geometric criteria. This is because the value of a criterion of the "signal" type is liable to vary if a distortion, such as a compression, for example, is applied to the image. Likewise, the watermarking of the block is liable to modify the value of such a criterion.

This is why step E440, following on from step E430, calculates the values taken by the blocks for the criteria of the "signal" type, assuming that the blocks will be watermarked.

In the preferred embodiment, where the watermarking of a block is effected by spreading of a bit equal to +1 or −1 over all the coefficients of a block, there are calculated, during step E440, the values taken by the blocks $B^i$ for the criteria of the "signal" type $S_k$, assuming on the one hand the insertion of a +1 bit and on the other hand the insertion of a −1 bit. These values are denoted respectively $S_k^i(+1)$ and $S_k^i(-1)$.

In practice, the criteria of the "signal" type are linked to the energy of the signal of the block in question, and are such that the variation of this energy, when spreading bit in all the coefficients of the block, is small.

However, in order to ensure that the order of two blocks $B^i$ and $B^j$ sequenced in accordance with a criterion of the "signal" type $S_k$ remains unchanged after watermarking, it is chosen, at step E450, to effect the sequencing only when the values $S_k^i(\pm 1)$ and $S_k^j(\pm 1)$ are sufficiently far away.

In practice, the sequencing is effected only when the following condition is fulfilled:

$$\min |S_k^i(b) - S_k^j(b')| > T_k, b, b' \in \{-1, 1\}$$

$T_k$ being a predetermined threshold dependent on the criterion of the "signal" type $S_k$.

Assuming, for example, that the values taken by the blocks $B^2$ and $B^3$ for a criterion $S_1$ are $S_1^2(+1)=50$, $S_1^2(-1)=60$, $S_1^3(+1)=200$, $S_1^3(+1)=205$, and that $T_1=80$, then there is obtained:

$$\min |S_1^2(b) - S_1^3(b')| = 140, b, b' \in \{-1, 1\}$$

and the blocks $B^2$ and $B^3$ can be sequenced according to $S_1$. Assuming that for $S_1$, $(B^i < B^j)$ if and only if max $(S_k^i(+1), S_k^i(-1)) < \min(S_k^j(+1), S_k^j(-1))$, one finds that $B^2 < B^3$ according to $S_1$.

The sequencing method continues during step E450 for all the pairs of blocks which it has not been possible to sequence according to geometric criteria at step E420. It terminates either when all the acceptable blocks are sequenced or when all the criteria of the "signal" type have been used.

The method then prepares to execute a step E460 in which the non-sequenced blocks are rejected. The number m of blocks actually sequenced represents, as will be seen below, the capacity of the image.

In the case of the example described above, the blocks $B^2$ and $B^3$ not sequenced by the geometric criteria were sequenced according to the criterion S1 and the final sequencing is obtained:

$$B^4 < B^5 < B^2 < B^3 < B^1$$

Assuming now that there is a set of m acceptable and sequenced blocks $\{B^1, \ldots, B^m\}$, for example $B^1 > \ldots > B^m$, there will be described, with reference to FIG. 6, a method of watermarking the digital image according to the invention.

The watermarking method according to the invention includes steps E610 to E680 implemented during the execution of a sequence of instructions of a computer program P2.

The watermarking method described here performs an operation of watermarking of the digital image 300 by a watermarking code C, this watermarking code being composed of c information bits $C_1, C_2, \ldots, C_c$.

As previously described, watermarking by "spread spectrum" makes it possible to insert a watermarking information bit in a block of coefficients. The m acceptable blocks, being sequenced unambiguously, therefore make it possible to insert a message of m bits in the image. It is said in this case that the capacity of the image is m.

Where m is less than or equal to c, it suffices for example to insert an information bit $C_i$ of the code C in each of the first i blocks $B^i$. In the case, on the other hand, where the capacity m of the image is insufficient, it can for example be envisaged truncating or compressing the watermarking code C.

Figure 6:
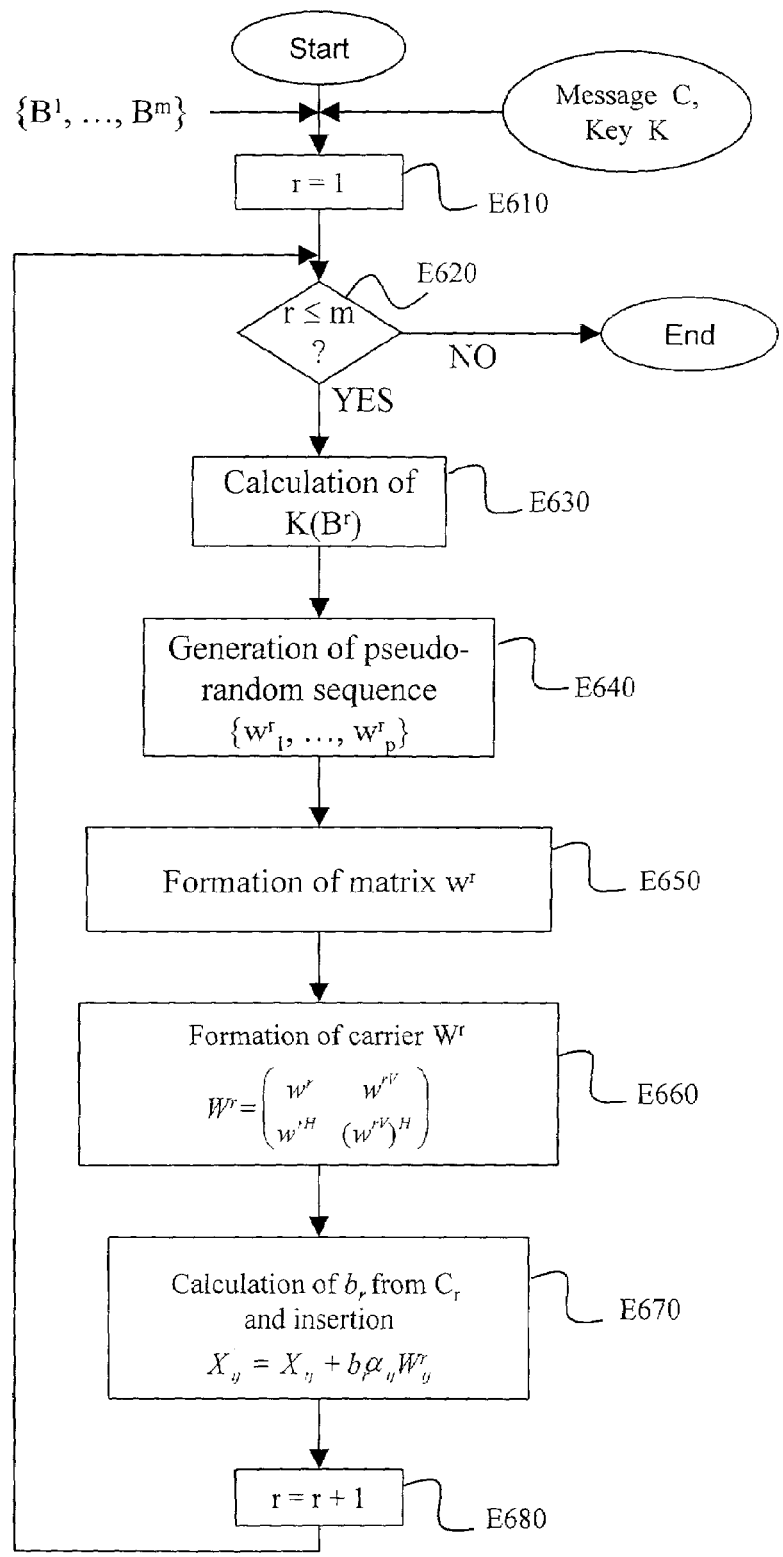
FIG. 6 depicts the main watermarking steps of the watermarking method according to the invention.

During step E610 of FIG. 6, the watermarking method according to the invention initialises a counter r to 1. Then the method prepares for performing a test step E620, during which the variable r is compared with the value m. As long as the variable r is less than or equal to the number m of acceptable and sequenced blocks, the test E620 makes it possible to effect a loop consisting of steps E630 to E680.

More precisely, the result of the test E620 is positive and the method prepares for performing the steps E630 to E670 of watermarking the block $B^r$, described below. At the end of these steps, the counter r is incremented at a step E680 and the method prepares once again for performing test E620. When the result of this test becomes negative, that is to say as soon as r becomes strictly greater than m, the watermarking method ends.

In the embodiment described here, the insertion of an information bit in a block of coefficients is effected by adding a sequence consisting of pseudo-random numbers over all the coefficients of the block in question. This watermarking method, also described in the patent application published under the number EP 1.043.687, uses a secret global key K for the initialisation of the generation of these pseudo-random numbers. This secret key K is therefore an input parameter of the watermarking method.

The watermarked image being liable to undergo a set of geometric transformations, the watermarking of a block must also be invariant with respect to these geometric transformations. The invariant watermarking of a block $B^r$ of acceptable coefficients will now be described with reference to steps E630 to E670 in FIG. 6.

At step E630 a watermarking key $K(B^r)$ of the block $B^r$ is calculated from the secret global key K. It is in fact preferable, in order to increase the security of the watermarking, to use a key dependent on the block. Since the decoder must also be capable of unambiguously recalculating this key $K(B^r)$ for the block $B^r$, use will be made of an algorithm for generating $K(B^r)$ taking into account the secret global key K, and also parameters which are invariant for the block with respect to the geometric transformations of the table of FIG. 1, such as the values of the geometric criteria $G_k$.

Once this key $K(B^r)$ has been calculated, the watermarking method generates, at step E640, a pseudo-random sequence $\{w^r_1, \ldots, w^r_p\}$ from $K(B^r)$. In a manner which is known in the field of "spread spectrum" coding spreading, any known distribution with a zero mean is suitable. The most usual distributions are the uniform distribution on $[-1, 1]$ and the standardised Gaussian distribution $N(0,1)$.

Where $B^r$ is a block of coefficients $X_{ij}$ such that $1 \leq i \leq 2P$ and $1 \leq j \leq 2Q$, the number p of elements for the random sequence will be $p = P*Q$.

These p coefficients are arranged in a matrix $w^r$ of P rows and Q columns at step E650, choosing, in the case of a rectangular matrix, to fill the matrix in the direction containing the most elements. Then, at step E660, a matrix $W^r$ of size 2P×2Q is constructed. This matrix is composed of the sub-matrix $w^r$ formed at the step E650 and the three sub-matrices $(w^{rV})$, $(w^{rH})$ $(w^{rV})^H$ corresponding respectively to the vertical, horizontal and diagonal transposes of $w^r$.

$$\text{More precisely: } W^r = \begin{pmatrix} W^r & W^{rV} \\ W^{rH} & (W^{rV})^H \end{pmatrix}$$

By construction, the matrix $W^r$, also referred to as the carrier, is invariant for any geometric transformation given in FIG. 1, as well as for any combination of these geometric transformations. It may be noted that the matrix $W^r$ is symmetrical when P and Q are identical.

Finally, step E670 is the step proper of insertion of the bit $b_r$ as a function of the information bit $C_r$ in all the coefficients of the block $B^r$.

In a manner known in the field of watermarking by spectrum spreading, and as described in the patent application number EP 1.043.687, the block $B'^r$ corresponding to the watermarked block $B^r$ is a block of coefficients X'i,j such that:

1≦i≦2P and 1≦j≦2Q, and $X'_{i,j}=X_{i,j}+b_r\alpha_{ij}W^r_{ij}$ with:
$b_r=1$ if $C_r=1$ and $b_r=-1$ if $C_r=0$,
$\alpha_{ij}$ designating a weighting amplitude.

In summary, the above description has explained a method of processing and more particularly of sequencing of the blocks of coefficients of a digital image and a method of watermarking these blocks by a "spread spectrum" method, which are both invariant with respect to the geometric transformations of FIG. 1. By combining these two methods, a robust and particularly reliable watermarking method is obtained.

The method of decoding the watermarking code according to the invention will now be described, with reference to FIG. 7.

The decoding method according to the invention includes steps E710 to E750 implemented during the execution of a sequence of instructions of a computer program P3.

The objective of this decoding is to find the watermarking code C inserted in the digital image 300 by the watermarking method whose algorithm is depicted in FIG. 6, this image being liable to have undergone at least one geometric transformation in the table in FIG. 1.

During a first step E710, a spatio-temporal transformation is applied to the image to be decoded 320. This step E710 is similar to step E210 of FIG. 2 and will therefore not be described again here.

Step E710 is followed by a step E720 of selecting the acceptable supports, similar to step E220. As described previously, the acceptable supports are the only supports liable to have been watermarked by a watermarking information bit.

The decoding method then performs a step E730 of decoding each of these acceptable supports $\{B'^1, \ldots, B'^N\}$. This step reliably decodes a bit $b'_i$ which is a function of the bit of the watermarking code C', inserted in the support $B'^i$. This decoding is entirely dependent on the watermarking method applied to the coder. In practice, in the case of a coding by a "spread spectrum" method, steps E720 and E730 are performed simultaneously.

In the preferred embodiment, this decoding starts with steps E630, E640, E650 and E660 already described with reference to FIG. 6. More precisely, it makes it possible, for each block $B'^i$, to find the pseudo-random carrier $W'^i$. A correlation calculation is then performed between this carrier $W'^i$ and the block of coefficients $B'^i$ tested. This calculation, as described in the patent application EP 1.043.687, makes it possible to find, for each block $B'^i$, on the one hand whether or not it has been watermarked by a bit, and in the case where it has been watermarked, on the other hand the value $b'_i=\{-1, +1\}$ of this bit.

It will be assumed hereinafter that the result of this step E730 of decoding the acceptable supports $\{B'^1, \ldots, B'^N\}$ is as follows:

For 1≦i≦3 $B'^i$ watermarked with $b'_i=-1$,
For 4≦i≦5 $B'^i$ watermarked with $b'_i=+1$,
For i>5 $B'^i$ not watermarked.

The decoding method then includes a step E740 of sequencing of the identified supports watermarked during step E730, that is to say for the supports $B'^i$, with 1≦i≦5 in this example. This step is similar to that of Figure E230 in FIG. 2.

It will be assumed hereinafter that the sequencing performed at step E740 gives, for the example described, the following result:

$B'^4 < B'^5 < B'^2 < B'^3 < B'^1$

The decoding method next includes a step E750 of sequencing of the bits decoded at step E730 according to an order of the watermarked supports obtained at step E740. By applying the match $C'_i=1$ for $b'_i=+1$ and $C'_i=0$ for $b'_i=-1$, the code of the message inserted by the coder in the image 300 is reconstructed. Obviously, for the example described here the watermarking code C'=11000 is obtained.

The present invention also concerns a device for processing a set of coefficients representing a digital image with a view to an insertion of at least one item of watermarking information, this image being liable to undergo a set of geometric transformations and said coefficients being grouped together in blocks.

This device comprises for example spatio-frequency transformation means, such as analysis filters associated with decimators by two adapted to effect a wavelet decomposition of an image 300.

It also has means of determining a set of so-called acceptable blocks adapted to receive at least one item of watermarking information. These means are for example adapted to calculate a probability of detectability of the watermarking information in a block, and to select the blocks for which this probability is high.

It also has means of sequencing, according to at least one predetermined criterion, at least some of the acceptable blocks, in an order which is invariant with respect to at least one geometric transformation.

These means are for example adapted to calculate, for the part of the acceptable blocks, a value for a set of predetermined criteria, and to classify the blocks according to these values. These sequencing means can in particular be integrated into a circuit implementing the sequencing steps described with reference to FIG. 4.

Such a device can be included in any system for processing information and in particular digital images, such as for example a digital camera or a scanner.

Figure 8:
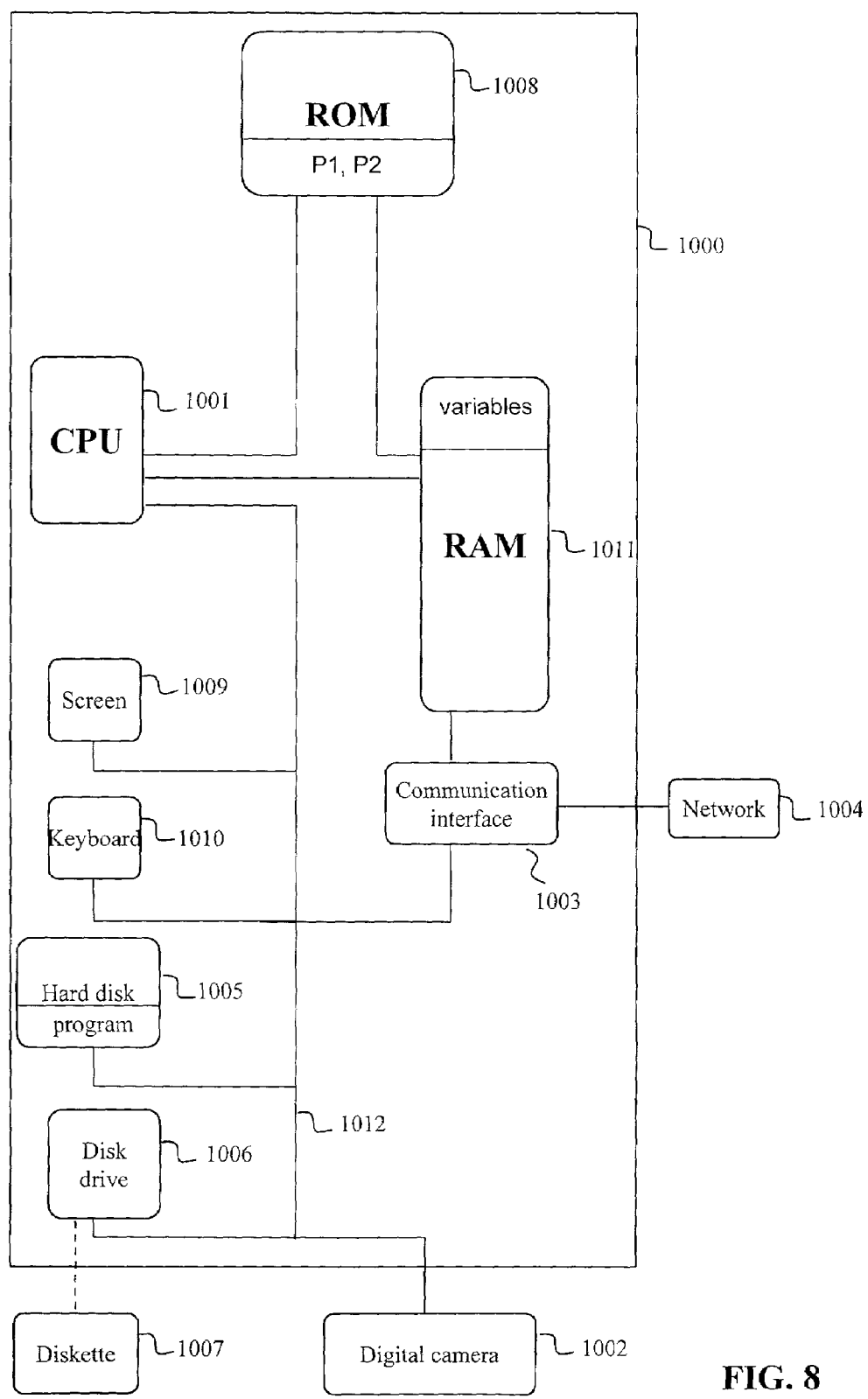
FIG. 8 depicts schematically a computer adapted to implement the methods of processing and watermarking a digital image according to the invention.

This device can in particular be integrated into a computer 1000 as illustrated in FIG. 8 and which constitutes a programmable apparatus.

Figure 4:
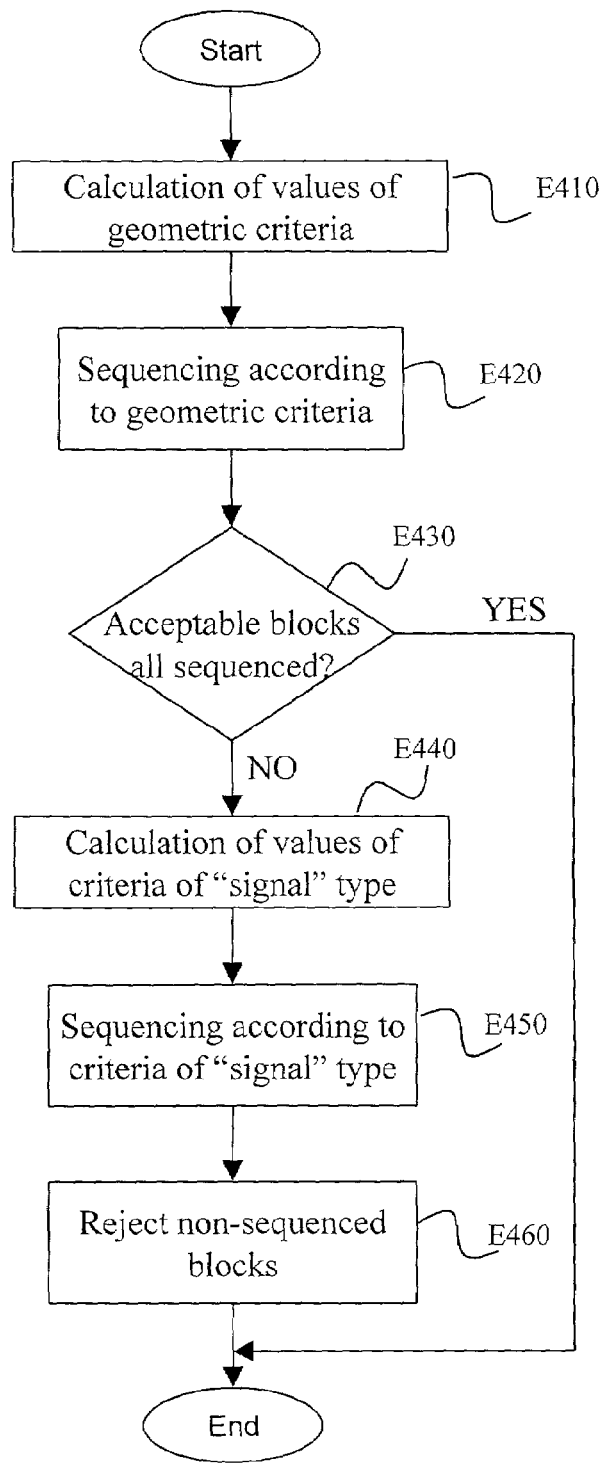
FIG. 4 depicts the main steps of sequencing of the processing method according to the invention.

In this embodiment, the method of processing a set of coefficients representing a digital image is implemented in the form of a computer program P1 associated with necessary hardware for its storage and execution. This computer program contains one or more sequences of instructions whose execution by the programmer makes it possible to implement the steps of the processing method according to the invention, whose algorithm is depicted in FIGS. 2 and 4.

In the computer depicted in FIG. 8, the above-mentioned means of the device are incorporated notably in a microprocessor 1001, a read only memory 1008 storing one or more programs P1 for implementing the processing method according to the invention and a random access memory 1011 containing registers adapted to store variables modified during the running of the program or programs.

The microprocessor 1001 is integrated into a computer 1000 which can be connected to different peripherals, such as for example, a digital camera 1002. This digital camera 1002 makes it possible notably to supply images to be authenticated by the insertion of a watermarking signal.

This computer 1000 has a communication interface 1003 connected to a communication network 1004 in order to receive, if necessary, images to be watermarked.

The computer 1000 also has document storage means, such as a hard disk 1005, or is adapted to cooperate, by means of a disk drive 1006, with removable document storage means such as diskettes 1007.

These fixed or removable storage means can also contain the code of the processing method according to the invention which, once read by the microprocessor 1001, will be stored in the hard disk 1005.

By way of variant, the program enabling the processing device to implement the invention can be stored in the read only memory 1008 (ROM).

According to another variant, the program can be received and stored as described previously by means of the communication network 1004.

The computer 1000 also has a screen 1009 for serving for example as an interface with an operator by means of the keyboard 1010 or any other means.

The microprocessor 1001 (CPU) will execute the instructions relating to the implementation of the invention. On powering-up, the program or programs on which the processing method relating to the invention is based and which are stored in a non-volatile memory, for example the read only memory 1008, are transferred into the random access memory 1011 (RAM). This memory will then contain the executable code of the invention as well as the variables necessary for implementing the invention.

This random access memory 1011 contains a set of registers for storing the variables necessary for executing the program or programs, notably a register for storing the coefficients representing the digital image (300) in the form of blocks, a register for storing the values $G^i_k$ taken by certain blocks for geometric criteria, and a register for storing the values $S^i_k(+1)$ and $S^i_k(-1)$ taken for some of these blocks for criteria of the "signal" type.

A communication bus 1012 allows the communication between the different elements of the computer 1000 and the peripherals.

The invention also concerns a device for watermarking a set of coefficients representing a digital image which is liable to undergo a set of geometric transformations, said coefficients being grouped together in blocks.

This device has in particular determination and sequencing means like the ones described above.

It also has means of inserting at least one item of watermarking information which is invariant with respect to at least one of said geometric transformations. These means are for example adapted to implement the steps of the watermarking method described with reference to FIG. 6.

Such insertion means can in particular be integrated into the computer 1000 described previously.

To do this, the microprocessor 1001 implements a computer program P2 containing several instructions whose execution by the microprocessor implements the steps of the watermarking method according to the invention, whose algorithm is depicted in FIG. 6. This program is for example stored in the read only memory 1008. Moreover, the random access memory 1011 contains a set of registers for storing the variables necessary for the execution of the watermarking program, and notably a register for storing the coefficients representing the acceptable blocks $B^i$, a register for storing the watermarking code C, a register for storing the key $K(B^i)$ dependent on the block currently being watermarked, a register for storing the pseudo-random sequence $\{w_1, \ldots, w_p\}$ and a register for storing the carrier W.

Finally, the invention concerns a device for decoding a watermarking code consisting of at least one item of watermarking information inserted in a set of coefficients representing a digital image, this image being liable to have undergone a set of geometric transformations and said coefficients being grouped together in blocks.

This device has in particular means of determining a set of so-called acceptable blocks, adapted to receive said at least one item of watermarking information as previously described.

It also has means of determining a set of so-called watermarked blocks amongst the acceptable blocks, said watermarked blocks actually having received said at least one item of watermarking information.

It also has means of decoding the watermarking information for each of said watermarked blocks.

These last two means can be produced by a circuit implementing the instructions described with reference to step E730 of FIG. 7, and detailed in the patent application EP 1.043.687.

The decoding device also has sequencing means according to at least one predetermined criterion such as those of the processing device already described above.

Finally, it has means of reconstituting the watermarking code by sequencing of the watermarking information as a function of the sequencing of the watermarked blocks. These means can be produced by a circuit implementing the instructions described with reference to step E750 of FIG. 7.

Figure 9:
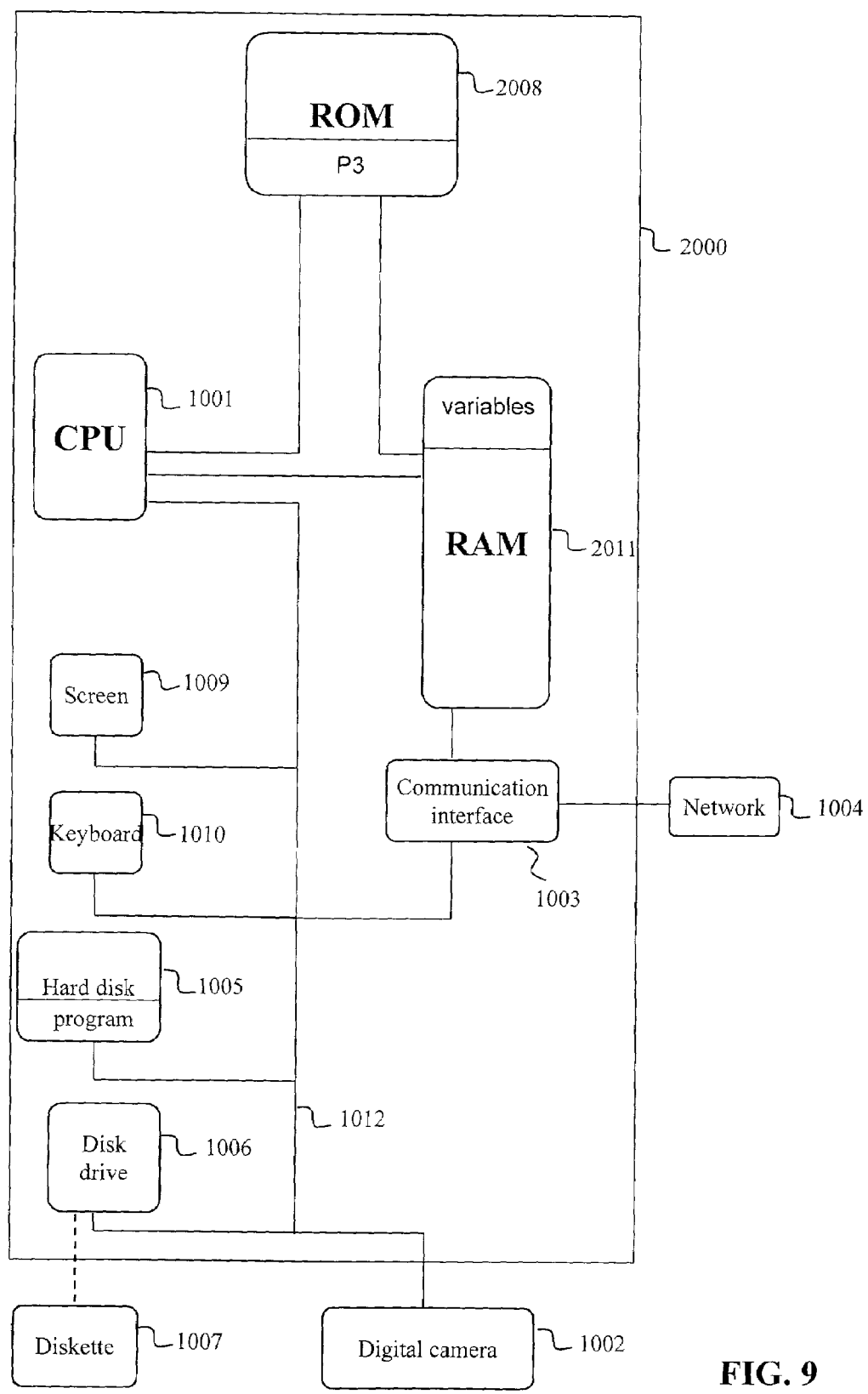
FIG. 9 depicts schematically a computer adapted to implement the method of decoding the watermarking code of a digital image according to the invention.

In general terms, this decoding device can be included in a programmable apparatus identical to the computer 1000 of FIG. 8 and which is represented in FIG. 9 by the reference denoted 2000.

In this figure only the read only memory 2008 and the random access memory 2011 differ from the corresponding components of the computer 1000 in FIG. 8. Since the other components in this figure remain unchanged compared with the corresponding components in FIG. 8, they keep their references and will not be described again.

Figure 7:
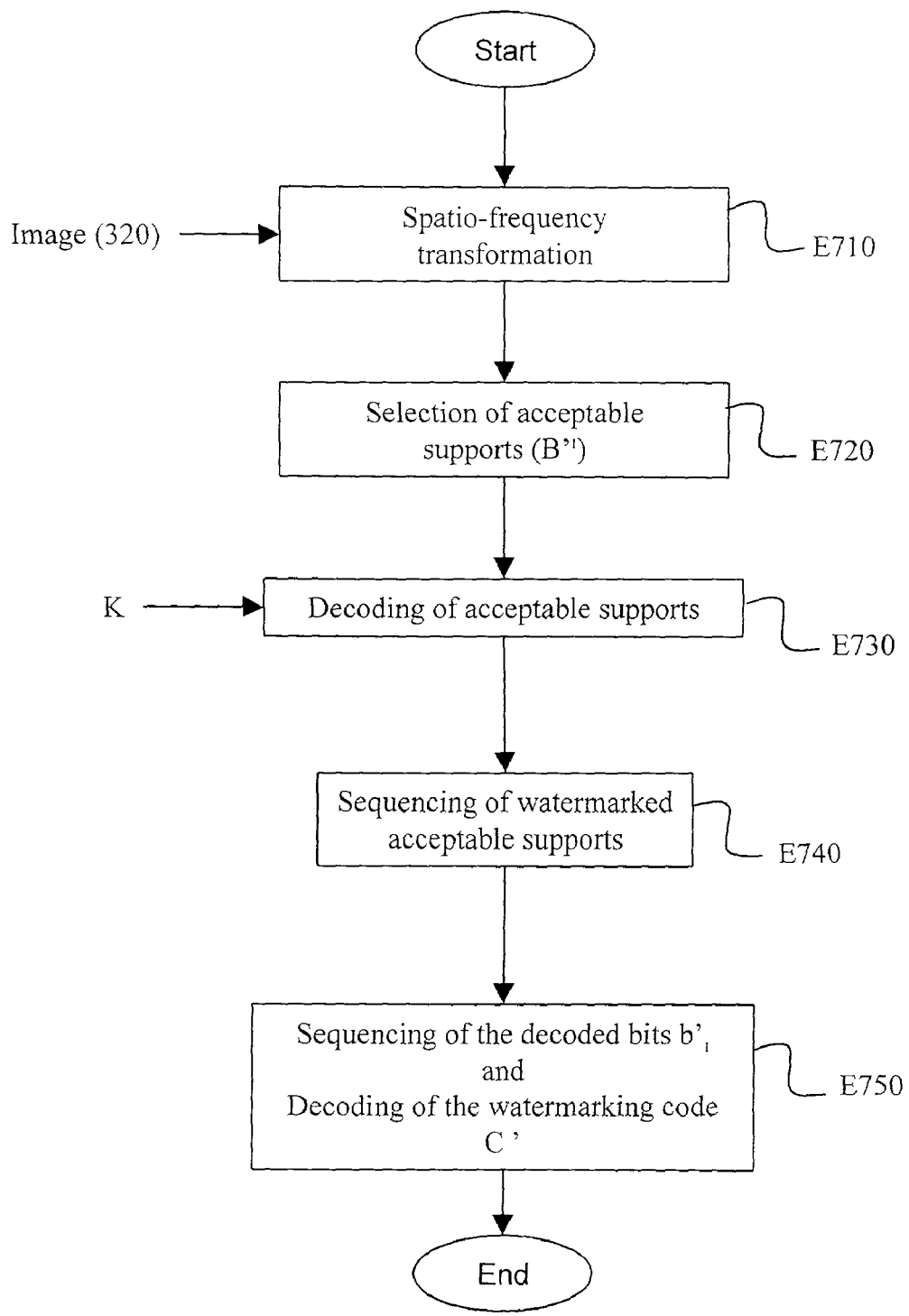
FIG. 7 depicts the main steps of the method of decoding a watermarking code inserted in a digital image according to the invention.

The microprocessor 1001 implements a computer program P3 containing several instructions whose execution by the computer 2000 implements the steps of the decoding method according to the invention whose algorithm is depicted in FIG. 7. This program is for example stored in the read only memory 2008. In addition, the random access memory 2011 contains a set of registers for storing the variables necessary for the execution of the program, and notably:

a register for storing the coefficients representing the blocks of the digital image 320 to be decoded;

a register for storing the values $G^i_k$ taken by some of these blocks for geometric criteria;

a register for storing the values $S^i_k(+1)$ and $S^i_k(-1)$ taken for some of these blocks for criteria of the "signal" type;

a register for storing the key K(B) dependent on a block currently being decoded;

a register for storing the pseudo-random sequence $\{w_1, \ldots, w_p\}$;

a register for storing the carrier W;

a register for storing, where applicable, part of an item of watermarking information detected in this block; and a register for storing the watermarking code C' reconstituted from these watermarking information parts.

Naturally, the present invention is in no way limited to the embodiments described and depicted, but quite the contrary encompasses any variant within the capability of an expert.

What is claimed is:

1. Method of processing a set of coefficients ($X_{i,j}$) representing a digital image (300) with a view to an insertion of at least one item of watermarking information (W') in said image, this image being liable to undergo a set of geometric transformations and said coefficients being grouped together in regions (B$^i$), said method being characterised in that it includes the following steps:

determining (E220), amongst at least some of said regions (B$^i$), a set of so-called acceptable regions, adapted to receive said at least one item of watermarking information (W'); and sequencing (E230), according to at least one predetermined criterion, at least one part of said set of acceptable regions (B$^i$), in an order which is invariant with respect to at least one of said geometric transformations.

2. Method according to claim 1, characterised in that said at least one part of said set of acceptable regions is sequenced, according to said at least one predetermined criterion, in an order which is invariant with respect to at least one combination of at least some of said geometric transformations.

3. Method according to claim 1 or 2, characterised in that the set of geometric transformations includes identity, rotations through 90, 180 (A20) and 270 degrees, vertical axis symmetry (A10), vertical axis symmetry (A10) followed by a rotation through 90 degrees, vertical axis symmetry followed by a rotation through 180 degrees and vertical axis symmetry followed by a rotation through 270 degrees.

4. Method according to either of claim 1 or 2, characterised in that the step (E230) of sequencing said at least one part of said set of acceptable regions (B$^i$) is performed according to at least one predetermined geometric criterion ($G_k$) whose value for a set of coefficients ($X_{i,j}$) is independent of said coefficients of the image.

5. Method according to either of claim 1 or 2, characterised in that said regions (B$^i$) of coefficients representing a digital image correspond to the frequency sub-bands of a wavelet decomposition (DWT) of said digital image.

6. Method according to claim 4, characterised in that said geometric criterion ($G_k$) is chosen from amongst the size of a region, its index of the resolution level, its type of sub-band and the distance from its centre to the centre of its sub-band.

7. Method according to either of claim 1 or 2, characterised in that the step (E230) of sequencing said at least one part of said set of acceptable regions (B$^i$) is performed according to at least one predetermined criterion ($S_k$) whose value for a set of coefficients ($X_{i,j}$) depends on the coefficients of said set.

8. Method according to claim 7, characterised in that the step (E230) of sequencing said at least one part of said set of acceptable regions (B$^i$) includes notably an evaluation of the values ($S^i_k(+1)$, $S^i_k(-1)$) which would be taken by said criterion ($S_k$) during the insertion of said at least one item of watermarking information (W').

9. Method according to claim 4, characterised in that the sequencing step (E230) is performed according to a subset of geometric criteria ($G_k$) before being performed according to a subset of criteria ($S_k$) whose value for a set of coefficients ($X_{i,j}$) depends on the coefficients of said set.

10. Method according to either of claim 1 or 2, characterised in that said acceptable regions (B$^i$) are such that the probability of detection of said at least one item of watermarking information received by these regions is greater than a predetermined threshold.

11. Method of watermarking a set of coefficients ($X_{i,j}$) representing a digital image (300) which is liable to undergo a set of geometric transformations and said coefficients being grouped together in regions (B$^i$), said method being characterised in that it includes the following steps:

determining (E220) a set of so-called acceptable regions (B$^i$) and sequencing (E230), according to at least one predetermined criterion, of at least one part of said set of acceptable regions, in an order which is invariant with respect to at least one of said geometric transformations, according to claim 1; and inserting at least one item of watermarking information (W'), for at least certain regions of said at least one part of said set of acceptable regions, said at least one item of watermarking information (W') being invariant with respect to at least one of said geometric transformations.

12. Method according to claim 11, characterised in that said at least one item of watermarking information (W') is invariant with respect to at least one combination of at least some of said geometric transformations.

13. Method according to claim 11 or 12, characterised in that the insertion of said at least one item of watermarking information (W') for a region (B'$^i$) of said one part of said set of acceptable regions corresponds to a spreading of a pseudo-random signal in all the coefficients ($X_{i,j}$) of said region.

14. Method according to claim 13, characterised in that the pseudo-random signal spread in all the coefficients of a region is dependent on said region.

15. Method according to claim 14, characterised in that it includes a step of generating the pseudo-random signal dependent on said region (B'$^i$) using a key (K(B'$^i$)) specific to said region (B'$^i$) and which is dependent on a secret global key (K).

16. Method of decoding a watermarking code (C') obtained from at least one item of watermarking information (W''$^i$) inserted in a set of coefficients (X'$_{i,j}$) representing a digital image (320), this image (320) being liable to have undergone a set of geometric transformations and said coefficients being grouped together in regions (B''$^i$), said method being characterised in that it includes the following steps:

determining (E720), amongst at least some of said regions (B''$^i$), a set of so-called acceptable regions, adapted to receive said at least one item of watermarking information (W''$^i$);

determining a set of so-called watermarked regions ($B^{ri}$) amongst said set of acceptable regions, said watermarked regions ($B^{ri}$) having received said at least one item of watermarking information ($W^{ri}$);

decoding (E730) said at least one item of watermarking information ($W^{ri}$) for each of said watermarked regions ($B^{ri}$);

sequencing (E740) said watermarked regions ($B^{ri}$) according to at least one predetermined criterion, in an order which is invariant with respect to at least one of said geometric transformations; and reconstituting said watermarking code (C') by sequencing said watermarking information ($W^{ri}$) as a function of said sequencing of said watermarked regions.

17. Method according to claim 16, characterised in that said watermarked regions ($B^{ri}$) are sequenced, according to said at least one predetermined criterion, in an order which is invariant with respect to at least one combination of at least some of said geometric transformations.

18. Method according to claim 16 or 17, characterised in that said at least one item of watermarking information ($W^{ri}$) is invariant with respect to at least one of said geometric transformations.

19. Method according to either of claim 16 or 17, characterised in that said at least one item of watermarking information ($W^{ri}$) is invariant with respect to at least one combination of at least some of said geometric transformations.

20. Method according to either of claim 16 or 17, characterised in that said acceptable regions ($B'_i$) are such that the probability of detection of said at least one item of watermarking information received by these regions is greater than a predetermined threshold.

21. Method according to either of claim 16 or 17, characterised in that said at least one item of watermarking information ($W^{r}$) received by a watermarked region ($B^{r}$) is a pseudo-random signal spread in all the coefficients ($X'_{i,j}$) of said region.

22. Method according to claim 21, characterised in that said pseudo-random signal spread in all the coefficients of a watermarked region is dependent on said watermarked region.

23. Device for processing a set of coefficients ($X_{i,j}$) representing a digital image (300) with a view to an insertion of at least one item of watermarking information ($W^{r}$) in said image, this image (300) being liable to undergo a set of geometric transformations and said coefficients ($X_{i,j}$) being grouped together in regions ($B^{i}$), said device being characterised in that it has:

means of determining, amongst at least some of said regions, a set of so-called acceptable regions ($B^{i}$), adapted to receive said at least one item of watermarking information ($W^{r}$); and means of sequencing, according to at least one predetermined criterion, at least one part of said set of acceptable regions ($B^{i}$), in an order which is invariant with respect to at least one of said geometric transformations.

24. Processing device according to claim 23, characterised in that the determination and sequencing means are incorporated in:

a microprocessor (1001);

a read only memory (1008) containing at least one program (P1) for processing the coefficients ($X_{i,j}$); and a random access memory (1011) containing registers adapted to record variables modified during the execution of said at least one program.

25. Device for watermarking a set of coefficients ($X_{i,j}$) representing a digital image (300) which is liable to undergo a set of geometric transformations and said coefficients ($X_{i,j}$) being grouped together in regions ($B^{i}$), said device being characterised in that it has:

means of determining, from amongst at least some of said regions, a set of so-called acceptable regions ($B^{i}$), adapted to receive said at least one item of watermarking information ($W^{r}$);

means of sequencing, according to at least one predetermined criterion, at least one part of said set of acceptable regions ($B^{i}$), in an order which is invariant with respect to at least one of said geometric transformations; and means of inserting at least one item of watermarking information ($W^{r}$), for at least certain regions ($B^{r}$) in said at least one part of said set of acceptable regions, said at least one item of watermarking information ($W^{r}$) being invariant with respect to at least one of said geometric transformations.

26. Watermarking device according to claim 25, characterised in that the determination, sequencing and insertion means are incorporated in:

a microprocessor (1001);

a read only memory (1008) containing at least one program (P2) for watermarking the coefficients ($X_{i,j}$); and a random access memory (1011) containing registers adapted to record variables modified during the execution of said at least one program.

27. Device for decoding a watermarking code (C') consisting of at least one item of watermarking information ($W^{ri}$) inserted in a set of coefficients ($X'_{i,j}$) representing a digital image (320), this image being liable to have undergone a set of geometric transformations and said coefficients ($X'_{i,j}$) being grouped together in regions ($B^{ri}$), said device being characterised in that it has:

means of determining, amongst at least some of said regions, a set of so-called acceptable regions ($B^{ri}$), adapted to receive said at least one item of watermarking information ($W^{ri}$);

means of determining a set of so-called watermarked regions ($B^{ri}$) amongst said set of acceptable regions, said watermarked regions having received said at least one item of watermarking information ($W^{ri}$);

means of decoding said at least one item of watermarking information ($W^{ri}$) for each of said watermarked regions;

means of sequencing said watermarked regions ($B^{ri}$) according to at least one predetermined criterion, in an order which is invariant with respect to at least one of said geometric transformations; and means of reconstituting said watermarking code (C') by sequencing the said watermarking information ($W^{ri}$) as a function of said sequencing of said watermarked regions ($B^{ri}$).

28. Device for decoding a watermarking code (C') according to claim 27, characterised in that the means of determining a set of so-called acceptable regions ($B^{ri}$), of determining a set of so-called watermarked regions ($B^{ri}$), of decoding and of reconstituting said watermarking code are incorporated in:

a microprocessor (1001);

a read only memory (2008) containing at least one program (P3) for decoding the watermarking code (C'); and a random access memory (2011) containing registers adapted to record variables modified during the execution of said at least one program.

29. Programmable apparatus, characterised in that it has means adapted to implement the processing method according to claim 1.

30. Programmable apparatus, characterised in that it has means adapted to implement the watermarking method according to claim 11.

31. Programmable apparatus, characterised in that it has means adapted to implement the decoding method according to claim 16.

32. Information storage means, possibly totally or partially removable, which can be read by a computer or a processor containing instructions of a computer program, characterised in that it makes it possible to implement the processing method according to claim 1.

33. Information storage means, possibly totally or partially removable, which can be read by a computer or a processor containing instructions of a computer program, characterised in that it makes it possible to implement the watermarking method according to claim 11.

34. Information storage means, possibly totally or partially removable, which can be read by a computer or a processor containing instructions of a computer program, characterised in that it makes it possible to implement the decoding method according to claim 16.

35. Computer program product stored on a computer readable medium which can be loaded into a programmable apparatus, containing sequences of instructions or portions of software code for implementing the steps of the processing method according to claim 1, when said computer program is executed by a programmable apparatus.

36. Computer program product stored on a computer readable medium which can be loaded into a programmable apparatus, containing sequences of instructions or portions of software code for implementing the steps of the watermarking method according to claim 11, when said computer program is executed by a programmable apparatus.

37. Computer program product stored on a computer readable medium which can be loaded into a programmable apparatus, containing sequences of instructions or portions of software code for implementing the steps of the decoding method according to claim 16, when said computer program is executed by a programmable apparatus.

* * * * *

UNITED STATES PATENT AND TRADEMARK OFFICE
CERTIFICATE OF CORRECTION

PATENT NO. : 6,990,213 B2 Page 1 of 1
APPLICATION NO. : 10/041576
DATED : January 24, 2006
INVENTOR(S) : Ioana Donescu It is certified that error appears in the above-identified patent and that said Letters Patent is hereby corrected as shown below:

COLUMN 15
Line 49, "claim" should read --claims--.
Line 55, "claim" should read --claims--.
Line 65, "claim" should read --claims--.

COLUMN 16
Line 15, "claim" should read --claims--.

COLUMN 17
Line 24, "claim" should read --claims--.
Line 29, "claim" should read --claims--.
Line 30, "B'$_i$" should read --B'$^i$--.
Line 34, "claim" should read --claims--.

Signed and Sealed this

Fifth Day of September, 2006

JON W. DUDAS
*Director of the United States Patent and Trademark Office*